(12) United States Patent
Schreck et al.

(10) Patent No.: US 8,094,418 B2
(45) Date of Patent: Jan. 10, 2012

(54) VERTICALLY STACKED DFH HEATER DESIGN FOR PROTRUSION SHAPE CONTROL

(75) Inventors: Erhard Schreck, San Jose, CA (US); Kowang Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 948 days.

(21) Appl. No.: 12/080,276

(22) Filed: Apr. 2, 2008

(65) Prior Publication Data

US 2009/0251828 A1  Oct. 8, 2009

(51) Int. Cl.
*G11B 5/39* (2006.01)
*G11B 5/56* (2006.01)

(52) U.S. Cl. ............... 360/317; 360/294.7; 360/125.31; 360/125.74

(58) Field of Classification Search ............ 360/317, 360/294.7, 125.31, 125.74
See application file for complete search history.

(56) References Cited

U.S. PATENT DOCUMENTS

| | | | |
|---|---|---|---|
| 6,999,265 B1 | 2/2006 | Schreck et al. | |
| 7,068,468 B2 | 6/2006 | Kamijima | |
| 7,095,587 B2 * | 8/2006 | Kurita et al. | 360/128 |
| 7,113,369 B2 | 9/2006 | Ota et al. | |
| 7,203,035 B2 | 4/2007 | Koide et al. | |
| 7,542,246 B1 * | 6/2009 | Song et al. | 360/319 |
| 7,729,086 B1 * | 6/2010 | Song et al. | 360/125.31 |
| 7,911,738 B2 * | 3/2011 | Kurita et al. | 360/125.74 |
| 2003/0099054 A1 * | 5/2003 | Kamijima | 360/59 |
| 2005/0254171 A1 * | 11/2005 | Ota et al. | 360/128 |
| 2006/0077591 A1 | 4/2006 | Kurihara et al. | |

* cited by examiner

*Primary Examiner* — Jefferson Evans
(74) *Attorney, Agent, or Firm* — Saile Ackerman LLC; Stephen B. Ackerman

(57) ABSTRACT

A vertically stacked DFH design in a read/write head is disclosed that allows independent control of write gap protrusion and read gap protrusion. A first heater is formed in an insulation layer proximate to a sensor in a read head. A second heater is formed in a second insulation layer proximate to the write pole tip in a main pole layer. The two heaters are connected in series or in parallel through leads to a power source that activates the heaters. In one embodiment, the heaters have a fixed resistance ratio. Preferably, there are two drivers in the power source so that a first power can be applied to the first heater and a second power can be applied to the second heater to enable an adjustment of reader protrusion/writer protrusion or gamma ratio. Fast reader and writer actuation is achieved and low power consumption is realized.

20 Claims, 3 Drawing Sheets

VERTICALLY STACKED DFH HEATER DESIGN FOR PROTRUSION SHAPE CONTROL

FIELD OF THE INVENTION

The invention relates to a merged read/write magnetic head in which read gap protrusion and write gap protrusion are controlled independently with a first dynamic fly heater (DFH) proximate to the main pole in a perpendicular magnetic recording (PMR) head and a second DFH heater proximate to a tunneling magnetoresistive (TMR) element in a read head.

BACKGROUND OF THE INVENTION

Perpendicular magnetic recording (PMR) has become the mainstream technology for disk drive applications beyond 200 Gbit/in$^2$, replacing longitudinal magnetic recording (LMR) devices. The demand for improved performance drives the need for a higher areal density which in turn calls for a continuous reduction in transducer size. A PMR head which combines the features of a single pole writer and a double layered media (magnetic disk) has a great advantage over LMR in providing higher write field, better read back signal, and potentially much higher areal density. Typically, a dual purpose transducer is preferred in which the write head (PMR function) is combined with a read head function in the same structure to form a merged read/write head. The read head may be based on a TMR element in which a tunnel barrier layer separates two ferromagnetic (FM) layers where a first FM layer has a fixed magnetization direction and the second FM layer has a magnetic moment that is free to rotate from a direction parallel to that of the "fixed" layer to a direction anti-parallel to the fixed layer and thereby establish two different magnetic states generally referred to as a "0" state and a "1" state. The read process determines which of the two states the TMR element has been written to.

It is well known that the magnetic storage density increases as the gap (flying or fly height) between the magnetic media and the merged read/write head decreases. In other words, the so-called air bearing surface (ABS) or exposed plane of the merged read/write head that includes the write pole tip is brought closer to the magnetic media to enhance performance. However, due to non-uniformity in production, the fly height may vary from one slider to the next. Therefore, a low fly height may easily cause one or both of the read head and write head to contact the magnetic media which leads to poor reliability and a damaged device. Furthermore, the heat generated when a current is applied to the coils in a write head tends to cause a thermal expansion of the write pole toward the magnetic media. If there is only one heater to control fly height between read/write head and magnetic media, then the read head may have a lower protrusion into the read gap than desired which causes a loss in read sensitivity. Gamma ratio is a critical parameter used to characterize a read/write head because it describes the relationship of mechanical minfly point to magnetic spacing. A lower gamma ratio means a larger gap between the mechanical minfly point and the reader location. An important head design objective is to achieve a gamma as close as possible to 1 which is ideal for tribology and magnetic performance since it keeps the gap between reader and minfly point at a constant value independent of DFH power (actuation). From a drive reliability point, the reader should not be at the minfly point which is the mechanically closet part of the head to the disk because the read head sensor is too sensitive towards mechanical impact. Ideally, the read head should be recessed from the minfly point by at least 0.5 nm.

A popular design used to control fly height is to position a dynamic fly heater (DFH) opposite the read head or the main pole layer in the write head with respect to the ABS. When the heater is activated, thermal expansion of nearby layers including the write pole in the write head effectively pushes the write pole tip closer to the magnetic media. Likewise, heating of layers in the vicinity of the sensor in the read head causes thermal expansion which results in a read head protrusion toward the magnetic media and thereby reduces the fly height.

One example of a thermal control mechanism is found in U.S. Pat. No. 7,068,468 where a read head element and a first heater are sandwiched between a lower flexible layer and a middle flexible layer, and a write head element and a second heater are sandwiched between the middle flexible layer and an upper flexible layer. The three flexible layers participate in the thermal expansion process and the two heaters are independently operated such that only one may be activated at a certain time.

In U.S. Pat. No. 7,113,369, leads for an inductive electromagnetic transducer and a magnetoresistive device are separated from each other by the leads of a heater so that crosstalk to the lead of the magnetoresistive device can be prevented when a current is supplied to the lead of the inductive electromagnetic transducer.

U.S. Pat. No. 7,203,035 discloses a heater formed in an overcoat layer above a magnetic write head. The heater has a heating part with a predetermined sheet resistance and a lead part which is connected in series to the heating part and has a sheet resistance lower than that of the heating part.

U.S. Patent Application No. 2006/0077591 describes a heat sink element used to prevent melting of the heat control layer in the heater element. The heat from the heat sink element flows selectively toward upper and lower shield layers and the magnetic pole layer and thereby reduces the amount of heat that is directed in other directions.

U.S. Pat. No. 6,999,265 teaches a first fly height adjustment using an electromechanical control mechanism and a second fly height adjustment with a thermal control mechanism.

Unfortunately, heater elements in the prior art tend to be located a substantial distance from the write pole tip and read head sensor element at the ABS. Thus, there is a significant actuation time for the heater elements to activate and for thermal energy to be transferred to the write pole tip and read head sensor along the ABS and thereby reduce the fly height. As a result, improvements in read time and write time are limited by a substantial actuation time. Furthermore, the heater elements heat a substantial part of the write head, read head, and surrounding layers so that considerable power consumption is required. A novel heater configuration is needed to allow an in-situ adjustment of gamma ratio that improves reader reliability, and to achieve short actuation times and low power consumption.

SUMMARY OF THE INVENTION

One objective of the present invention is to provide two or more DFH heaters that enable independent control of read gap protrusion and write gap protrusion.

Another objective of the present invention is to provide a merged read/write head structure according to the first objective in which a first heater is positioned proximate to a TMR element in the read head and a second heater is formed proximate to the write pole tip in the write head to allow an in-situ adjustment of gamma to about 1 and provide a fast actuation time and low power consumption.

These objectives are realized in the present invention by providing a merged read/write head on a substrate in which a first heater having a first resistance value is formed proximate to a sensor in the read head and is recessed a certain distance from an ABS plane. In addition, a second heater having a second resistance value is formed proximate to the write pole tip in the main pole layer in the write head and is recessed a certain distance from the ABS. The two heaters are essentially resistors that are connected by leads to a power source such as a preamplifier or a PCB board. The heaters may be a planar layer of conductive material comprised of W, Ta, or NiCu that is about 400 to 1000 Angstroms thick and with a length and width of 10 to 30 microns in a plane that is perpendicular to the ABS. In one embodiment, each heater forms a meander pattern and has two ends that are connected to electrical leads. The meander pattern may comprise a plurality of turns between the first end and second end such that a plurality of segments is aligned parallel to the ABS and a plurality of segments is aligned perpendicular to the ABS. Optionally, the two heaters may have a straight line shape or a rounded shape.

In one embodiment, the first heater is formed in an insulation layer disposed on an AlTiC substrate (slider body), and the second heater is formed in an insulation layer just below the main pole layer. This configuration allows for a short rise time for reader actuation which leads to a fast response and low power consumption. Likewise, the close proximity of the second heater to the write pole tip enables fast writer actuation and low power consumption. The decoupling of reader protrusion and writer protrusion can be accomplished by simply changing the resistance ratio between the two heaters. Resistance in the heaters can be changed in the design by varying the heater thickness, changing the shape of the heater, or changing the composition of the heater. Preferably, a preamplifier or PCB board with one or more drivers is used to provide power to the heaters via leads that are connected to the ends of the heaters.

In a first embodiment, the second heater is formed above a bucking coil layer. The ratio of the first resistance to the second resistance value is fixed and the two heaters are connected in series. There is a second embodiment that comprises an additional lead in a parallel connection that allows for an in-situ adjustment of gamma ratio. In other words, the first heater and second heater can be operated independently so that the second heater is turned on to protrude the writer toward the disk during a write process while the first heater is turned off to keep the reader recessed during writing and more protected from head disk interference (HDI). In an alternative embodiment, one or more additional heaters may be included in the merged read/write head. For example, a third dynamic fly heater (DFH) may be formed in an insulation layer behind the back gap connection. In this embodiment, one or more of the heaters may be independently controlled.

The first and second heaters may be formed by well known processes in the exemplary embodiment. For example, the first heater may be fabricated by forming a first insulation layer on a bottom shield that overlies an AlTiC substrate. A first photoresist layer is coated and patterned on the insulation layer to generate openings in a pattern that corresponds to the desired shape of the first heater and leads. An etch process is employed to form a patterned opening in the first insulation layer using the first photoresist layer as a mask. The opening does not expose the bottom shield layer. The material selected for the first heater is deposited to partially fill the opening to the intended thickness of the first heater. Then a second insulation layer is deposited on the first heater to fill the opening. Subsequently, a chemical mechanical polish (CMP) process may be used so that the second insulation layer which fills the opening is coplanar with the top surface of the first insulation layer. A similar process may be followed to form the second heater in the insulation layer below the main pole layer.

DETAILED DESCRIPTION OF THE INVENTION

The preferred embodiments of the invention are now described with respect to the drawings in which various elements of a merged read/write head are illustrated. Although the writer portion of the merged head design described herein is preferably a perpendicular magnetic recording element, the present invention is not bound by any particular write head or read head configurations and encompasses a variety of structural designs as appreciated by those skilled in the art.

Figure 1:
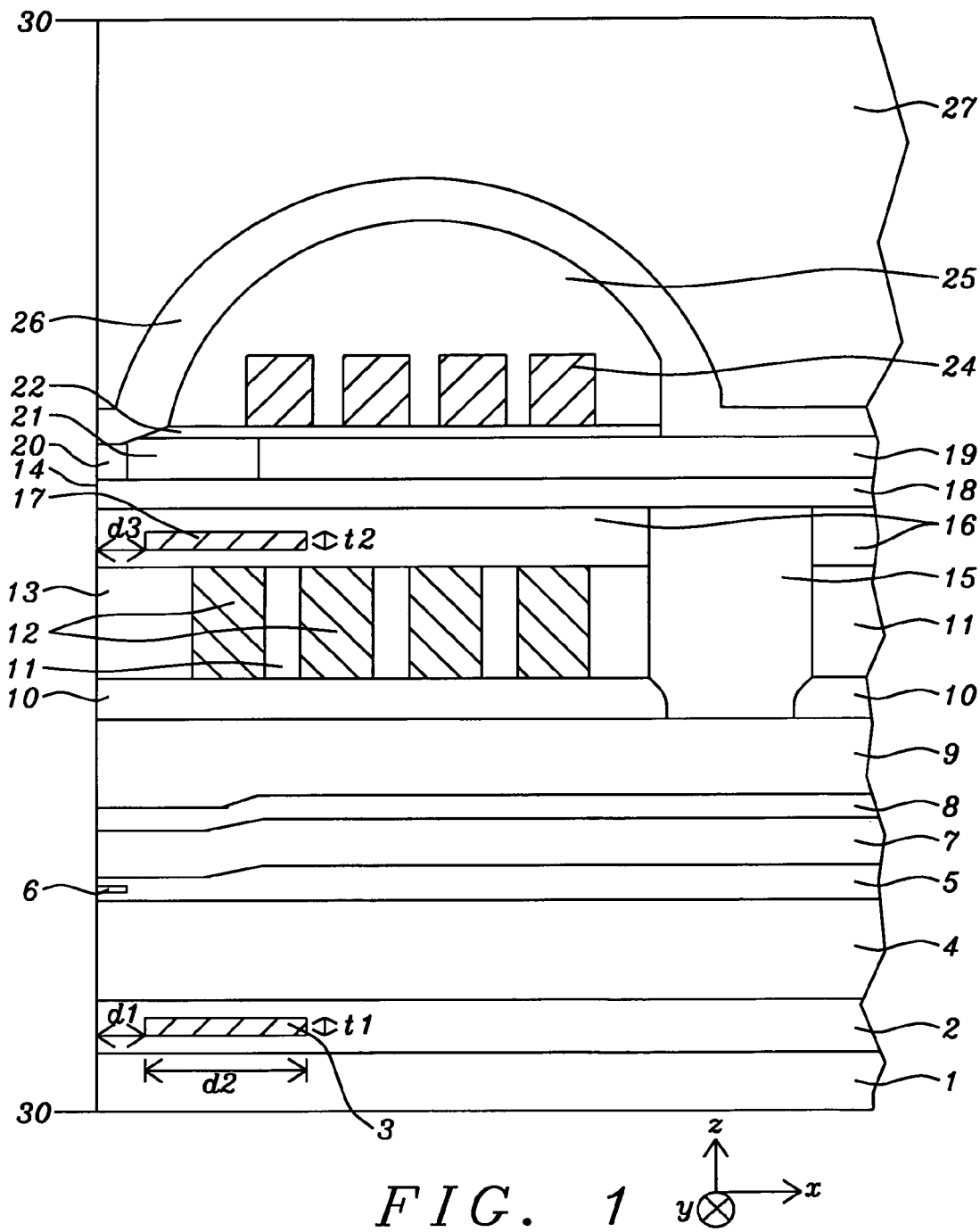
FIG. 1 is a cross-sectional view of a merged read-write head having a first heater formed proximate to a sensor in the read head and a second heater formed proximate to the main pole layer in the write head according to one embodiment of the present invention.

Referring to FIG. 1, one embodiment of the present invention is depicted in a cross-sectional view from a plane orthogonal to an air bearing surface (ABS) 30-30. The merged read/write head is formed on a substrate 1 which represents a slider body and is typically comprised of AlTiC (alumina+TiC). An insulation layer 2 is disposed on the AlTiC substrate 1 and may be made of a dielectric material such as alumina. Above the insulation layer 2 is a bottom shield 4 that may be comprised of NiFe, for example. A gap layer 5 is shown on the bottom shield and is generally comprised of bottom and top insulating layers (not shown). A magnetoresistive element or sensor 6 is formed in the gap layer 5 along the ABS 30-30 and typically includes a plurality of layers (not shown) in which two ferromagnetic layers are separated by a non-magnetic layer to establish a "0" or "1" magnetic state, depending on whether the two ferromagnetic layers are magnetically aligned in the same direction or in an anti-parallel fashion. The non-magnetic layer may be Cu as in a giant magnetoresistive (GMR) sensor or may be comprised of an insulator such as alumina or MgO in a tunneling magnetoresistive (TMR) sensor.

A first top shield layer 7, insulation layer 8, and second top shield layer 9 are formed sequentially on the gap layer 5. Top shield layers 7, 9 may be made of the same magnetic material as in the bottom shield 4 and insulation layer 8 may be the same dielectric material as in insulation layer 2. Those skilled in the art will recognize that layers 2-8 represent the read head portion of the merged read/write head and layers 9-27 represent the write head portion. A DFH heater 3 is also included in the read head and will be described in a later section.

There is a first section of an insulation layer 10 formed on the second top shield layer 9 and between the ABS 30-30 and a back gap connection 15. Note that the insulation layer 10 has a second section that adjoins the back gap connection along a side opposite the first section. A bucking coil layer 12 is disposed on the first section of insulation layer 10 and in the exemplary embodiment is shown with four turns that are separated from each other by an insulation layer 11 comprised of a photoresist material. The portion of bucking coil layer 12 closest to the ABS 30-30 is coplanar with an insulation layer 13 that is formed along the ABS. The top surfaces of insulation layers 11, 13 and bucking coil layer 12 are coplanar in this embodiment. Insulation layers 10, 11, 13 are comprised of a dielectric layer and bucking coil layer is typically a conductive material such as Cu. The back gap connection 15 may be made of CoFeNi or the like and magnetically couples the main pole layer 17 to the second top shield 9 that serves as a flux return pole.

An insulation layer 16 is formed on insulation layers 11, 13 and on bucking coil layer 12 and a first section extends from the ABS 30-30 to the back gap connection 15. Both of the insulation layers 11, 16 have a second section on the opposite side of the back gap connection 15 with respect to the ABS. Above the insulation layer 16 is a main pole layer 17 that may be comprised of CoFeNi or another magnetic material. Main pole layer 17 has a pole tip 14 at the ABS 30-30 and extends toward the back end of the device with a sufficient length to connect with back gap connection 15. A first write shield layer 20 is disposed on the main pole layer 17 at the ABS and extends a throat height distance (not shown) away from the ABS 30-30 to connect with a non-magnetic layer 21. The first write shield layer 20 may be made of CoFeN, CoFeNi, NiFe, or CoFe, for example, and is coplanar with the non-magnetic layer 21 and a yoke 19 which is formed on the main pole layer 17 and serves to concentrate magnetic flux at the write pole tip 14. There is an insulation layer 22 formed on a portion of the non-magnetic layer 21 and yoke 19. Magnetic flux in the yoke 19 is generated by passing a current through the main coil layer 24 that is disposed on the insulation layer 22. The main coil layer 24 has a plurality of turns but only four turns are depicted in the drawing.

There is a second shield layer 26 formed on the first shield layer 21 along the ABS and which arches over the main coil layer 24 and connects with the top surface of the yoke 19 in a region overlying the back gap connection 15. An insulation layer 25 is formed on the insulation layer 22 and fills the openings between the turns of the main coil layer 24 and the space between the main coil layer and the arched second shield layer 26. A protection layer 27 covers the second shield layer 26 and is made of an insulating material such as alumina. It should be understood that during a read or write operation, there is a magnetic recording disk having a top surface that forms a plane parallel to the ABS 30-30 and which is separated from the ABS by a distance of approximately 8 nm.

A key feature of the present invention is a plurality of dynamic fly heaters hereafter called heaters that are formed in the merged read/write head to provide independent control of write gap protrusion and read gap protrusion. In other words, the spacing between the sensor 6 and the magnetic recording disk (not shown) and the spacing between the write pole tip 14 and magnetic recording disk are determined separately by controlling the amount of heat (and thermal expansion) in the vicinity of the sensor and write pole tip. In the exemplary embodiment, there is a first heater 3 formed in insulation layer 2 proximate to the sensor 6 in the read head and there is a second heater 17 formed in insulation layer 16 proximate to the write pole tip 14 and main pole layer 18. This configuration allows improved control in the read gap spacing during a write operation.

In typical merged read/write heads having only one DFH heater, the higher thermal expansion of certain materials in the write head generally results in the write gap protrusion being larger than the read gap protrusion. As a result, the reader/writer protrusion ratio also known as the gamma ratio is generally much less than 1 which diminishes read head sensitivity. From a drive reliability point, the reader (sensor) should not be at the minfly point because the reader is too sensitive towards mechanical impact. Ideally, the sensor should be recessed by at least 0.5 nm from the minfly point. This condition should be independent of ambient temperature and DFH actuation and only a gamma value of 1 can accommodate this requirement. For gamma <1, the mechanical spacing to disk reduces more than the magnetic spacing for the reader, and the opposite is true for a gamma >1.

According to the invention described herein, placement of the heaters 3, 17 may be optimized so that a gamma of approximately 1 can be realized and the time constant of reader actuation matches with the reading physics while the time constant of writer actuation matches with the perpendicular writing physics.

As illustrated in FIG. 1, the first heater 3 is preferably formed in insulation layer 2 and is recessed from the ABS by a distance d1 of 2 to 20 microns. Insulation layer 2 is about 1 micron thick and the thickness t1 of the first heater 3 is about 400 to 1000 Angstroms. A second heater 17 is preferably formed in insulation layer 16 and is recessed from the ABS 30-30 by a distance d3 of about 2 to 20 microns. The second heater 17 has a thickness t2 similar to t1. Both heaters 3, 17 have a length d2 along the x-axis direction of about 10 to 30 microns and a width (not shown) along the y-axis direction of about 10 to 30 microns and are stacked vertically with respect to the z-axis or down-track direction. The heaters 3, 17 may be comprised of a thin layer of conductive material such as W, Ta, or NiCu.

Figure 2:
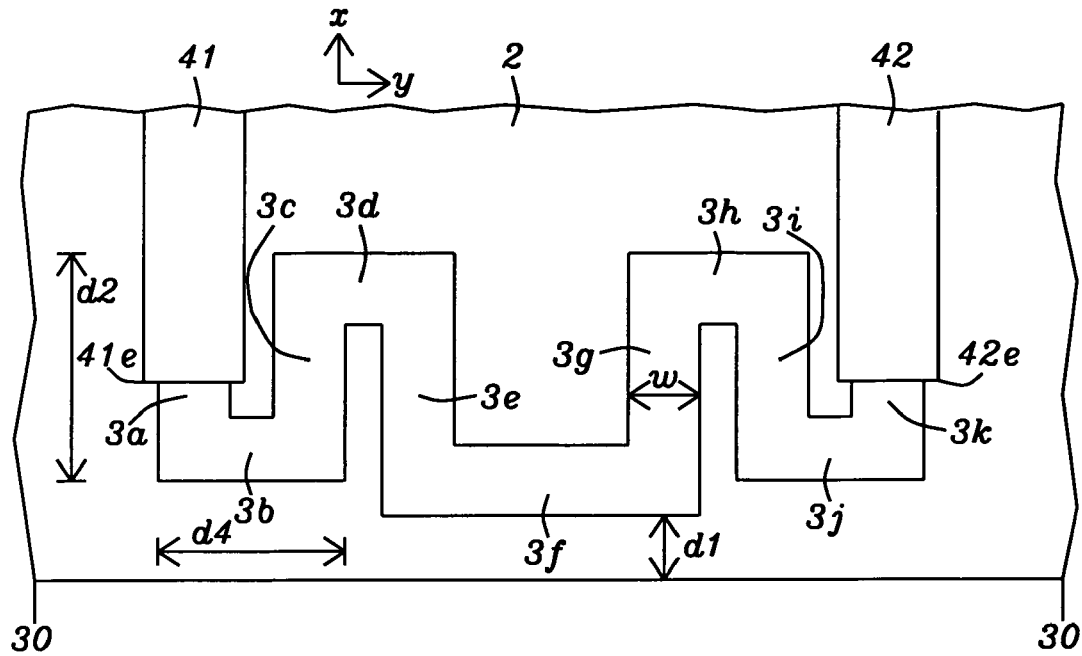
FIG. 2 is a top-down view of the first heater that has a meander pattern with a plurality of segments aligned in a direction parallel to the ABS, a plurality of segments aligned in a direction perpendicular to the ABS, and a lead connected to each end according to one embodiment of the present invention.

Referring to FIG. 2, a top-down view of heater 3 is shown in the "x, y" plane. In one embodiment, the first heater 3 has a meander shape with a plurality of segments shown as 3b, 3d, 3f, 3h, and 3j aligned in a direction parallel to the ABS 30-30 and a plurality of segments 3a, 3c, 3e, 3g, 3i, and 3k aligned in a direction perpendicular to the ABS. Note that the length d4 of segment 3b is not necessarily equivalent to the length of segments 3d, 3f, 3h, and 3j. Similarly, segments 3a, 3c, 3e, 3g, 3i, 3k may or may not have equivalent lengths in the x-axis direction. However, the width w of all the segments is preferably equivalent and is about 0.5 to 5 microns, and more preferably about 3 microns in order to provide a resistance that generates the desired heating output with an applied power of 0 to 100 mWatts. Segment 3a has an end that adjoins an end 41e of lead 41 and segment 3k has an end that adjoins an end 42e of lead 42. Leads 41, 42 are electrically connected to a preamplifier (not shown) that controls the power applied to first heater 3. Second heater 17 may have a similar meander shape and size to that of first heater 3 and has a lead at each end which is connected to the preamplifier. A meander shape can be advantageously employed to cancel a substantial amount of the magnetic field generated when a current is passed through a dynamic fly heater 3, 17. However, the present invention also encompasses other heater configurations such as a straight line shape or a rounded shape and these alternative shapes will provide a similar benefit compared with a meander shape.

Those skilled in the art will appreciate that the thickness, composition, and shape may be independently optimized for each heater 3, 17 to provide a desired resistance value. The protrusion of sensor 6 toward a magnetic recording disk is controlled by the resistance value of heater 3 and the amount of power applied to heater 3. Likewise, the protrusion of write pole tip 14 toward a magnetic recording disk during a write mode is controlled by the resistance value of heater 17 and the amount of power applied to heater 17.

In one embodiment, heaters 3, 17 are connected in series (not shown) to a preamplifier or PCB board and thereby have a fixed resistance ratio determined by their respective shape, thickness, and composition. Protrusion into the read gap and write gap is controlled by the amount of power applied to the two heaters 3, 17, respectively, and the gamma ratio (reader protrusion/writer protrusion) remains constant.

Figure 3:
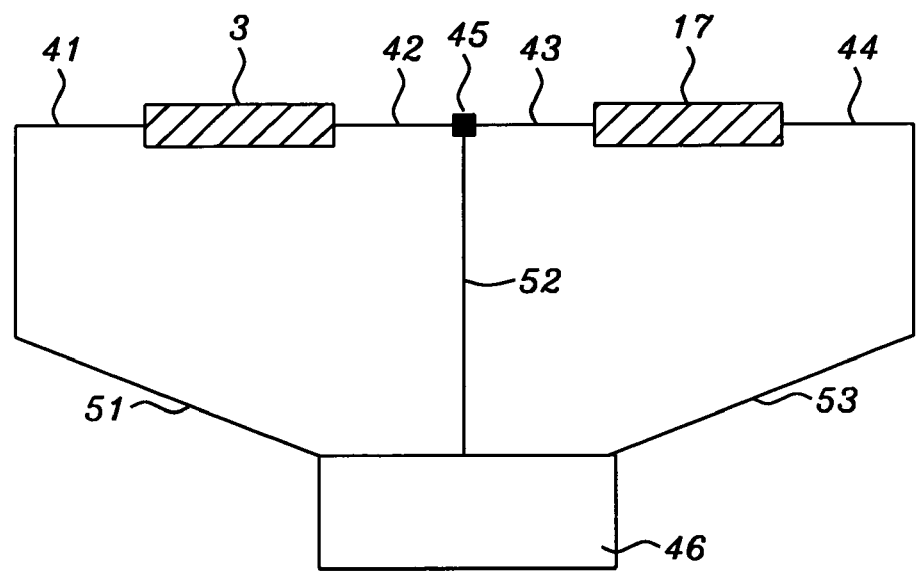
FIG. 3 is an electrical wiring diagram that depicts an embodiment wherein the first and second heaters are independently controlled by a preamplifier.

Referring to FIG. 3, a greater degree of control of the gamma ratio is realized by an embodiment wherein the heaters 3, 17 are connected in parallel with a preamplifier 46 by using three connections and a control point 45 that may also be considered a grounding location which allows a current from the preamplifier or PCB board to pass through heater 3 only, heater 17 only, or through both heaters 3, 17. For reader actuation, a current passes from preamplifier 46 through connection 52 and control point 45 to lead 42 and into heater 3. The first circuit is completed with lead 41 and connection 51 back to preamplifier 46. For writer actuation, a current passes from preamplifier 46 through connection 52 and control point 45 to lead 43 and into heater 17. The second circuit is completed with lead 44 and connection 53 back to the preamplifier. Furthermore, the preamplifier 46 may be comprised of two drivers so that a first power level is applied via the first circuit to heater 3 at a first time period while a second power level is applied via the second circuit to heater 17 during a second time period. In one embodiment, the first and second time periods do not overlap. Optionally, the first and second time periods may overlap. Thus, the write pole tip 14 may be purposely lowered closer to the magnetic recording disk during a write process while the sensor 6 in the read head is kept recessed and more protected from head disk interference. Moreover, the sensor 6 may be intentionally lowered closer to the magnetic disk during a read process while the write pole tip 14 is recessed. Essentially, an in-situ adjustment of gamma ratio is realized which improves head reliability as well as read and write performance.

Besides gamma ratio adjustment, additional benefits of the independent heater control configuration described herein are achieved. For example, since first heater 3 is in close proximity to sensor 6, and second heater 17 is in close proximity to write pole tip 14, there is a significantly faster response with regard to reader actuation and writer actuation than in the prior art where heaters are typically a greater distance from the sensor in the read head and the write pole tip in the write head than in the present invention. In addition, lower power consumption is realized because less heat is wasted from heating unnecessary portions of the read/write head that are located at substantial distances from the sensor and write pole tip. According to the embodiments described herein, only localized heating proximate to the sensor 6 and write pole tip 14 is required.

The present invention encompasses other heater designs wherein a first DFH heater may be formed in a read head layer other than within insulation layer 2. For example, heater 3 may be formed in the gap layer 5 or in insulation layer 8 proximate to sensor 6. Likewise, the second DFH heater may be formed in a write head layer other than insulation layer 16. In one alternative embodiment, the second heater 17 is formed in insulation layer 13. Thus, a vertical stacking of heaters is maintained in the z-direction. Note that vertical stacking does not require the two heaters 3, 17 to be recessed the same distance from the ABS. Essentially, three conditions may exist where the recess distance d1 for first heater 3 and the recess distance d3 for second heater 17 have the following relationships: d1>d3; d1<d3; and d1=d3. The same electrical connections to a preamplifier or PCB board may be employed as shown in FIG. 3.

The present invention also encompasses other heater designs that include more than two heaters. For instance, a third DFH heater (not shown) may be formed in the insulation layer 10 opposite the back gap connection 15 with respect to the ABS 30-30. Alternatively, a third DFH heater may be included in an insulation layer in the read head portion of the merged read/write head. The third DFH heater may be connected in series with the heaters 3, 17 or may be independently controlled by a preamplifier through a parallel connection. A third heater may be employed to redefine the actuation profile at the ABS.

The fabrication sequence used to build the merged read/write head as presented herein comprises well known deposition, planarization, patterning, and etching techniques that will not be described in detail except for formation of heaters 3, 17. Generally, insulation layers may be formed by a physical vapor deposition (PVD) or sputter deposition process. Magnetic layers including the bottom shield 4, first top shield 7, second top shield 9, back gap connection 15, main pole layer 18, and yoke 19 may be formed by an electrodeposition method. Conductive layers including bucking coils 12 and main coil layer 24 may be formed by a conventional damascene process in which openings are etched in an insulation layer and then filled with a metal layer followed by a CMP process to planarize the layer. Processes to form an opening in a layer typically comprise providing an etch template by coating and patterning a photoresist layer (not shown) on a certain layer. The patterned photoresist layer then serves as an etch mask while openings in the pattern are transferred into the underlying layer by employing an etch process such as a reactive ion etch.

Figure 4:
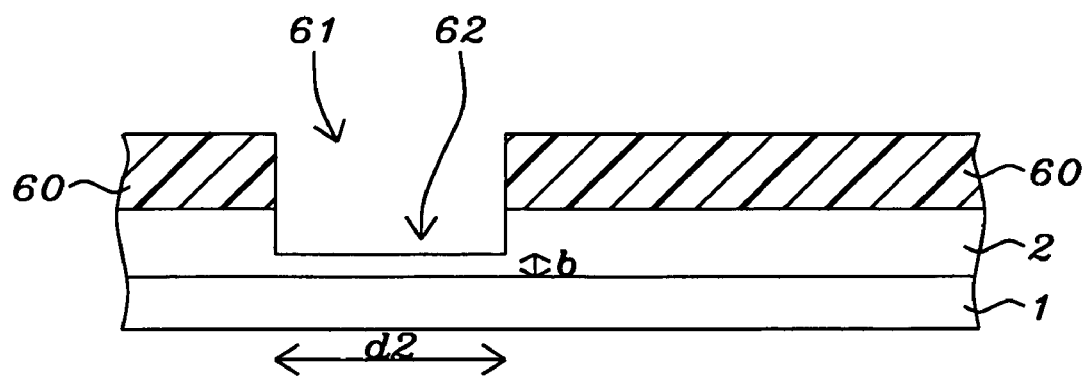
FIG. 4 is a cross-sectional view of a partially formed merged read/write head showing an opening that is formed in an insulation layer prior to depositing a first heater layer according to an embodiment of the present invention.

Referring to FIG. 4, the first heater 3 may be formed by a first step of patterning a photoresist layer 60 on insulation layer 2 to give an opening 61 with the desired length d2 along the x-axis and desired width (not shown) along the y-axis. Then an etch process is used to transfer the pattern into the insulation layer 2 and stops a certain distance b from the AlTiC substrate 1 thereby forming an opening 62. The opening 62 may have a meander shape that corresponds to the heater shape depicted in FIG. 3. Optionally, the opening 62 may have another configuration such as a straight line shape or a rounded or polygonal shape. Furthermore, the opening 62 may include a trench (not shown) connected to each end of the heater shape and which extends towards the back end of the read/write head. The trenches will subsequently be filled with a conductive metal to simultaneously form the first heater 3 and leads 41, 42 that connect to heater pads (not shown) and a preamplifier (or PCB) circuit.

Figure 5:
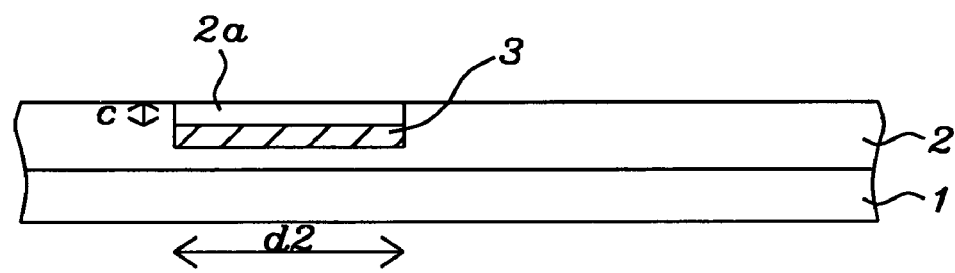
FIG. 5 is a cross-sectional view of the read/write head structure in FIG. 4 after a first heater is deposited to partially fill the opening in the insulation layer and an insulation material is deposited on the first heater to completely fill the opening.

Referring to FIG. 5, a material such as W, Ta, or NiCu is deposited by a sputtering process, for example, to partially fill the opening 62 (and lead trenches) and form the first heater 3. Next, an insulation material preferably having the same composition as in insulation layer 2 is deposited on the heater 3 to fill the opening 62 and form an insulation layer 2a having a thickness c. A planarization process may be employed to remove the photoresist layer 60 and excess insulation layer 2a so that a planar surface comprised of layers 2, 2a is produced. In the exemplary embodiment, layer 2a is made of the same material as the surrounding insulation layer and will be referred to as insulation layer 2.

Figure 6:
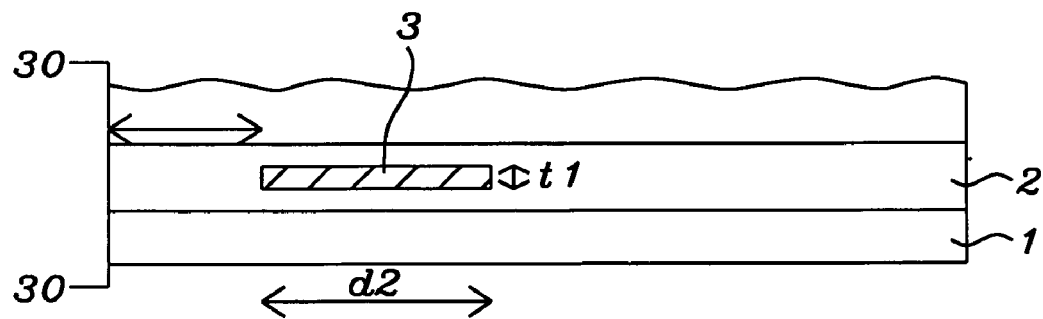
FIG. 6 is a cross-sectional view of the read/write head structure in FIG. 5 after all of the read head and write head layers have been deposited and a lapping process is used to form an ABS plane and a recessed distance d1 for the first heater.

Referring to FIG. 6, the remainder of the read head layers and write head layers are laid down. It should be understood that heater 17 may be formed in insulation layer 16 using the same sequence of steps as outlined for heater 3 formation in insulation layer 2. Once all of the merged read/write head layers are formed, a lapping process is employed to form an ABS 30-30 and define a recess distance d1 for heater 3, and a recess distance d3 for heater 17 as illustrated in FIG. 1.

While this invention has been particularly shown and described with reference to, the preferred embodiment thereof, it will be understood by those skilled in the art that various changes in form and details may be made without departing from the spirit and scope of this invention.

We claim:

1. A merged read/write magnetic head comprising:
   (a) a first stack of layers formed on a substrate and comprising a read head, said first stack of layers includes:
      (1) a first insulation layer formed on the substrate
      (2) a bottom shield layer on the first insulation layer;
      (3) a gap layer on the bottom shield layer wherein said gap layer has a sensor formed therein and the sensor is disposed along an air bearing surface (ABS);
      (4) a first dynamic fly (DFH) heater formed in the first insulation layer, or in said gap layer, or in a second insulation layer formed between the gap layer and a top shield within the read head, and proximate to the sensor wherein the first DFH heater is connected to a preamplifier or PCB board that provides a power to activate the first DFH heater that causes the sensor to protrude toward a magnetic recording disk which is positioned a certain distance from the ABS during a read or write mode,
   (b) a second stack of layers formed on the first stack of layers and comprising a write head wherein the second stack of layers includes:
      (1) a third insulation layer formed between the top shield and a main pole layer and with a first end at the ABS;
      (2) the main pole layer formed on the third insulation layer and with a write pole tip at the ABS; and
      (3) a second DFH heater formed in the third insulation layer, or in a fourth insulation layer that adjoins the ABS between the top shield and the main pole layer within the write head and proximate to the write pole tip wherein the second DFH heater is connected to a preamplifier or PCB board that provides a power to activate the second DFH heater and causes the write pole tip to protrude toward said magnetic recording disk during a read or write mode.

2. The merged read/write magnetic head of claim 1 wherein the first DFH heater and second DFH heater are recessed from the ABS by about 2 to 20 microns.

3. The merged read/write magnetic head of claim 1 wherein the first DFH heater and second DFH heater are connected in series with the power source and the first DFH heater has a first resistance value and the second DFH heater has a second resistance value so that when a power is supplied a fixed ratio of sensor protrusion/write pole tip protrusion is realized.

4. The merged read/write magnetic head of claim 1 wherein the first DFH heater and second DFH heater are connected in parallel with the power source so that a first power may be supplied to the first DFH heater during a first time period and a second power may be supplied to the second DFH heater during a second time period to independently control sensor protrusion and write pole tip protrusion.

5. The merged read/write magnetic head of claim 4 wherein the first time period does not overlap with the second time period.

6. The merged read/write magnetic head of claim 1 wherein each of the first DFH heater and second DFH heater has a thickness between about 400 to 1000 Angstroms, a length in a direction perpendicular to the ABS of about 10 to 30 microns, and a width in a direction parallel to the ABS of about 10 to 30 microns.

7. The merged read/write magnetic head of claim 1 wherein each of the first DFH heater and second DFH heater has a straight line shape, a rounded shape, or a meander shape having two ends that are each connected to a lead, and has a plurality of segments aligned in a direction parallel to the ABS and a plurality of segments aligned in a direction perpendicular to the ABS.

8. The merged read/write magnetic head of claim 1 wherein the first DFH heater and second DFH heater are comprised of W, Ta, or NiCu.

9. The merged read/write magnetic head of claim 1 further comprising a third dynamic fly heater formed in a third insulation layer in the read head or write head and wherein the third DFH heater is connected to the power source.

10. The merged read/write head of claim 9 wherein the third DFH heater is connected in series or in parallel with the first and second DFH heaters.

11. A vertically stacked dynamic fly heater structure comprising:
   (a) a read head formed on a substrate, said read head includes a sensor element along an ABS and a first dynamic fly heater formed in an insulation layer or gap layer proximate to the sensor element, the insulation layer or gap layer are formed between the substrate and a top shield; and
   (b) a write head formed on the read head wherein the write head includes a main pole layer having a write pole tip along the ABS and a second dynamic fly heater formed in an insulation layer adjoining the ABS and formed between the top shield and the main pole layer, and proximate to the write pole tip, said first DFH heater and second DFH heater are connected to a power source such that the ratio of sensor protrusion/write pole tip protrusion can be adjusted.

12. The vertically stacked DFH heater structure of claim 11 wherein the first DFH heater and second DFH heater are comprised of W, Ta, or NiCu.

13. The vertically stacked DFH heater structure of claim 11 wherein the first and second DFH heaters are connected in parallel with a power source such that a first power may be applied to the first DFH heater during a first time period to cause the sensor to protrude toward a magnetic recording disk and a second power may be applied to the second DFH heater during a second time period to cause the write pole tip to protrude toward the magnetic recording disk.

14. A method of forming vertically stacked DFH heaters in a merged read/write head comprising:
   (a) forming a first insulation layer on a substrate in a read head;

(b) forming an opening in the first insulation layer that leaves a portion of the first insulation layer between the opening and said substrate;
(c) partially filling the opening with a conductive material having a first resistance to form a conductive layer that includes a first DFH heater;
(d) forming a second insulation layer on the conductive layer such that the second insulation layer is coplanar with the first insulation layer;
(e) forming a gap layer on the first and second insulation layers and a sensor in the gap layer;
(f) forming a stack of layers on the gap layer wherein said stack includes a top shield layer in the read head and a plurality of layers in a write head comprising:
  (1) a third insulation layer formed on the top shield layer and having a second conductive layer comprised of a second DFH heater with a second resistance formed therein; and
  (2) a main pole layer formed on the third insulation layer; and
(g) performing a lapping process to form an ABS that includes an end of the sensor, an end of the third insulation layer, and a write pole tip in the main pole layer, said first DFH heater is recessed a first distance from the ABS and is proximate to the sensor and said second DFH heater is recessed a second distance from the ABS and is proximate to the write pole tip.

15. The method of claim 14 wherein the first distance and second distance are from about 2 to 20 microns.

16. The method of claim 14 wherein each of said first DFH heater and second DFH heater has a thickness from about 400 to 1000 Angstroms, a length between about 10 and 30 microns in a direction perpendicular to the ABS, and a width from about 10 to 30 microns in a direction parallel to the ABS.

17. The method of claim 14 wherein the first conductive layer further comprises two leads attached to the first DFH heater and the second conductive layer is further comprised of two leads attached to the second DFH heater, said leads are connected to a power source.

18. The method of claim 17 wherein the power source is comprised of two drivers such that a first power may be supplied via a first circuit to the first DFH heater and a second power may be supplied via a second circuit to the second DFH heater.

19. The method of claim 18 wherein the first power activates the first heater and causes the sensor to protrude towards a magnetic recording disk and the second power activates the second heater and causes the write pole tip to protrude towards the magnetic recording disk.

20. The method of claim 14 wherein each of the first DFH heater and second DFH heater has a straight line shape, a curved shape, a polygonal shape, or a meander shape in a plane orthogonal to the ABS, said meander shape is comprised of a plurality of segments aligned in a direction perpendicular to the ABS and a plurality of segments aligned parallel to the ABS.

* * * * *